United States Patent
Wu

(10) Patent No.: US 10,830,350 B2
(45) Date of Patent: Nov. 10, 2020

(54) SLIDE ROLLER

(71) Applicant: Chun Yi Wu, Miaoli (TW)

(72) Inventor: Chun Yi Wu, Miaoli (TW)

(*) Notice: Subject to any disclaimer, the term of this patent is extended or adjusted under 35 U.S.C. 154(b) by 366 days.

(21) Appl. No.: 16/044,513

(22) Filed: Jul. 25, 2018

(65) Prior Publication Data

US 2018/0328484 A1 Nov. 15, 2018

(51) Int. Cl.
*F16H 61/662* (2006.01)
*F16H 29/12* (2006.01)
*F16H 55/52* (2006.01)

(52) U.S. Cl.
CPC ....... *F16H 61/66245* (2013.01); *F16H 29/12* (2013.01); *F16H 55/52* (2013.01); *F16H 61/66259* (2013.01)

(58) Field of Classification Search
CPC ............. F16H 55/563; F16H 61/66245; F16H 63/067; F16H 57/04; F16G 5/166
USPC .......................................................... 474/13
See application file for complete search history.

(56) References Cited

U.S. PATENT DOCUMENTS

| | | | | | |
|---|---|---|---|---|---|
| 3,680,403 | A | * | 8/1972 | Schupan | F16H 61/66245 474/13 |
| 3,685,366 | A | * | 8/1972 | Schupan | F16H 55/563 474/13 |
| 4,384,862 | A | * | 5/1983 | Nakane | F16H 61/66245 192/105 B |
| 5,154,673 | A | * | 10/1992 | Fukunaga | F16H 55/563 474/13 |
| 6,520,878 | B1 | * | 2/2003 | Leclair | F16H 55/563 474/12 |
| 6,682,450 | B2 | * | 1/2004 | Mukai | F16H 55/563 474/12 |
| 7,276,004 | B2 | * | 10/2007 | Wu | F16H 55/563 474/13 |
| 7,637,828 | B2 | * | 12/2009 | Murayama | F16H 55/563 474/12 |
| 7,803,074 | B2 | * | 9/2010 | Ishida | F16H 63/067 474/8 |
| 10,393,263 | B2 | * | 8/2019 | Simpson | F16H 63/067 |
| 10,422,417 | B2 | * | 9/2019 | Wu | F16H 9/12 |
| 2006/0258492 | A1 | * | 11/2006 | Wu | F16H 55/563 474/13 |

* cited by examiner

*Primary Examiner* — Henry Y Liu

(57) ABSTRACT

A slide roller is provided. A lower connecting surface of the roller is never in contact with a roller passage surface. By taking advantage of a normal distance between a corner sliding surface and a center point of the roller greater than a vertical distance between an upper sliding surface of the roller and the center point, a pulley disc assembly can be started lightly, the acceleration in the middle stage of the slide stroke is increased, and speed transmission in the rear stage of the slide stroke is increased.

1 Claim, 7 Drawing Sheets

SLIDE ROLLER

FIELD OF THE INVENTION

The present invention relates to a slide roller, and more particularly to a slide roller that makes a stepless transmission start lighter and provides better acceleration performance, enabling a driving pulley disc assembly to drive a driven pulley disc assembly with a lower rotational speed to produce a higher speed transmission effect.

BACKGROUND OF THE INVENTION

A conventional slide roller aims at the variation of the shape of a traditional round roller to improve the abnormal wear of the traditional round roller and to increase the starting acceleration and extreme acceleration. As to the variation of the shape of the conventional roller, the vertical distance $D_2$ between the upper sliding surface and the center point 0 is greater than the vertical distance between the right contact surface and the center point 0, namely, $D_2 > D_3$, to achieve automatic compensation of wear and tear on the roller and increase the speed. However, when in use, the conventional slide roller is still not ideal or there are some flaws during the speed change and the middle stage of acceleration. When the vehicle is driving at a high speed, the fuel-efficient performance at a low rotational speed is not fully utilized.

As shown in FIG. 1 and FIG. 2, in a plurality of embodiments of the conventional slide roller 1, the normal distance $D_4$ between the lower sliding surface G and the center point 0 corresponds to the radius r of the conventional round roller and is equal to the radius r. The vertical distance $D_2$ between the upper sliding surface D and the center point 0 must be less than the normal distance $D_4$ between the lower sliding surface and the center point 0 (i.e. $D_2 < D_4$) to match with an immovable back plate 7. As shown in FIGS. 1, 2, 3 and 4, during the slide of the conventional slide roller 1, in order to avoid interference before the extreme speed, the normal distance $D_3$ between the right contact surface F and the center point 0 is less than the vertical distance $D_2$ between the upper sliding surface D and the center point 0 (i.e., $D_2 > D_3$). As a result, as shown in FIG. 2, before sliding, the distance between the center point 0 of the conventional slide roller 1 and the center of the rotary shaft is $A_0$, and the distance between the belt 9 and the center of the rotary shaft is $B_0$. Since $B_0$ is not the minimum distance, the starting torque needs improvement. As shown in FIG. 3, in the middle stage of the slide of the conventional slide roller, the distance between the center point 0 and the center of the rotary shaft is $A_1$. Because the distance $B_1$ from the belt 9 to the center of the rotary shaft is slightly small, a slight delay in the rapidity of the middle stage occurs. As shown in FIG. 4, in the rear stage of the slide of the conventional slide roller 1, when the distance between the belt 9 and the center of the rotary shaft is the maximum distance $B_2$, the distance $A_2$ between the center point 0 and the center of the rotary shaft is slightly large. As a result, the driving pulley disc assembly needs to drive the driven pulley disc assembly with a higher rotational speed to produce the extreme speed.

Accordingly, the inventor of the present invention has devoted himself based on his many years of practical experiences to solve these problems.

SUMMARY OF THE INVENTION

The primary object of the present invention is to provide a slide roller. A plurality of rollers is applied to a driving pulley disc assembly of a stepless speed change mechanism. The driving pulley disc assembly includes an immovable driving pulley disc, a movable driving pulley disc, and an immovable back plate. The movable driving pulley disc has a plurality of roller passage surfaces. The roller passage surfaces each have an inner retaining wall surface at an inner end therefor and an outer retaining wall surface at an outer end thereof. The immovable back plate has limiting surfaces opposite to the roller passage surfaces, respectively. The rollers are located between the roller passage surfaces and the limiting surfaces, respectively. The roller is composed of a weight and a wear-resistant layer around the weight. A peripheral surface of the wear-resistant layer has an upper sliding surface, an inner contact surface, a lower connecting surface, a corner sliding surface, and an outer contact surface. The upper sliding surface is an inclined sliding surface corresponding to a corresponding one of the limiting surfaces of the immovable back plate and acting on the corresponding limiting surface. The inner contact surface is a curved surface configured to abut against the inner retaining wall surface when the roller is located at a lowest point of a corresponding one of the roller passage surfaces of the movable driving pulley disc. The lower connecting surface is disposed at a lowermost end of the roller and connected with the inner contact surface. The corner sliding surface is disposed between the lower connecting surface and the outer contact surface and corresponds to the corresponding roller passage surface of the movable driving pulley disc. The corner sliding surface is a curved sliding surface that can act on the corresponding roller passage surface. The outer contact surface is configured to abut against the outer retaining wall surface when the roller is located at a highest point of the corresponding roller passage surface of the movable driving pulley disc. A center of the weight is defined as a center point 0. A normal distance from the center point 0 to the inner contact surface is defined as $D_1$. A vertical distance from the center point 0 to the upper sliding surface is defined as $D_2$. A normal distance from the center point 0 to the outer contact surface is defined as $D_3$. A normal distance from the center point 0 to the corner sliding surface being defined as $D_4$. The roller is characterized in that: the lower connecting surface of the roller is never in contact with the roller passage surface when the corner sliding surface acts on the roller passage surface, the normal distance $D_1$ from the center point 0 to the inner contact surface is equal to the vertical distance $D_2$ from the center point 0 to the upper sliding surface and is equal to the normal distance $D_3$ from the center point 0 to the outer contact surface, and the normal distance $D_4$ from the center point 0 to the corner sliding surface is greater than the vertical distance $D_2$ from the center point 0 to the upper sliding surface.

When the driving pulley disc assembly is started to rotate, the roller is slid on the roller passage surface of the movable driving pulley disc by the centrifugal force. The size of the grooves of the driving pulley disc assembly and the driven pulley disc assembly is changed, so that the positional diameters of the belts in the driving pulley disc assembly and the driven pulley disc assembly are mutually changed to achieve a speed change. During the speed change, the slide stroke of the roller on the roller passage surface of the movable driving pulley disc is shorter, and the wear can be less. The lower connecting surface of the roller is never in contact with the roller passage surface, and the corner sliding surface between the lower connecting surface and the outer contact support surface is in contact with and acts on the roller passage surface. By taking advantage of the normal distance $D_4$ between the corner sliding surface and the center point 0 greater than the vertical distance $D_2$ between the upper sliding surface and the center point 0, namely, $D_4 > D_2$, in the initial stage of starting the driving pulley disc assembly, the belt can be closer to the center of the rotary shaft of the driving pulley disc assembly, resulting in a lighter starting effect. In the middle stage of the slide stroke of the corner sliding surface of the roller sliding on the roller passage surface, because the action of pushing the movable driving pulley disc outwardly is large, better acceleration can be obtained. The better acceleration of the earlier speed change in the middle stage of the slide stroke enables the driving pulley disc assembly to drive the driven pulley disc assembly at a lower rotational speed to produce a higher speed transmission effect in the rear stage of the slide stroke of the roller.

DETAILED DESCRIPTION OF THE PREFERRED EMBODIMENTS

Embodiments of the present invention will now be described, by way of example only, with reference to the accompanying drawings.

Figure 5:
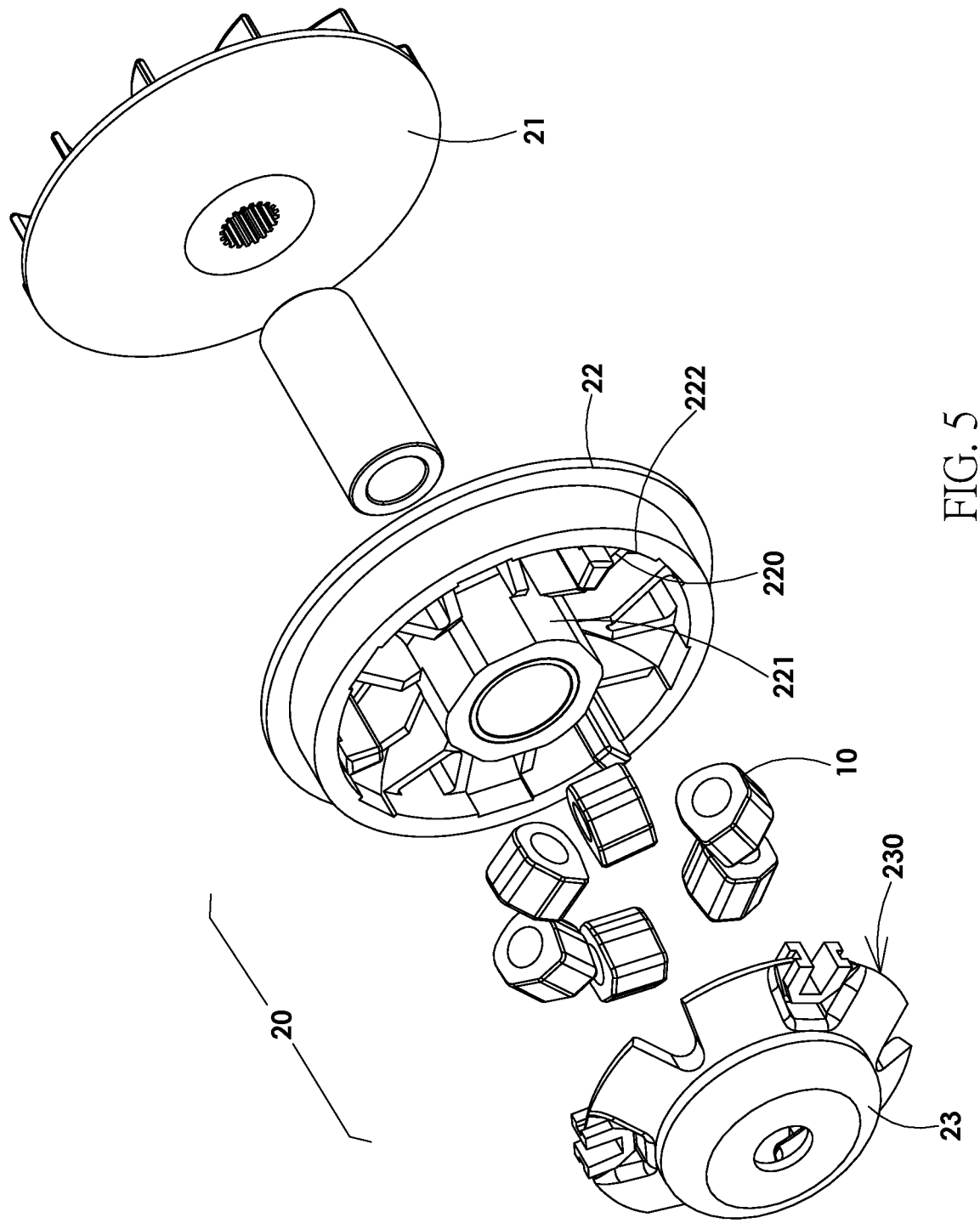
FIG. 5 is an exploded view of the roller of the present invention applied to the driving pulley disc assembly.
Figure 6:
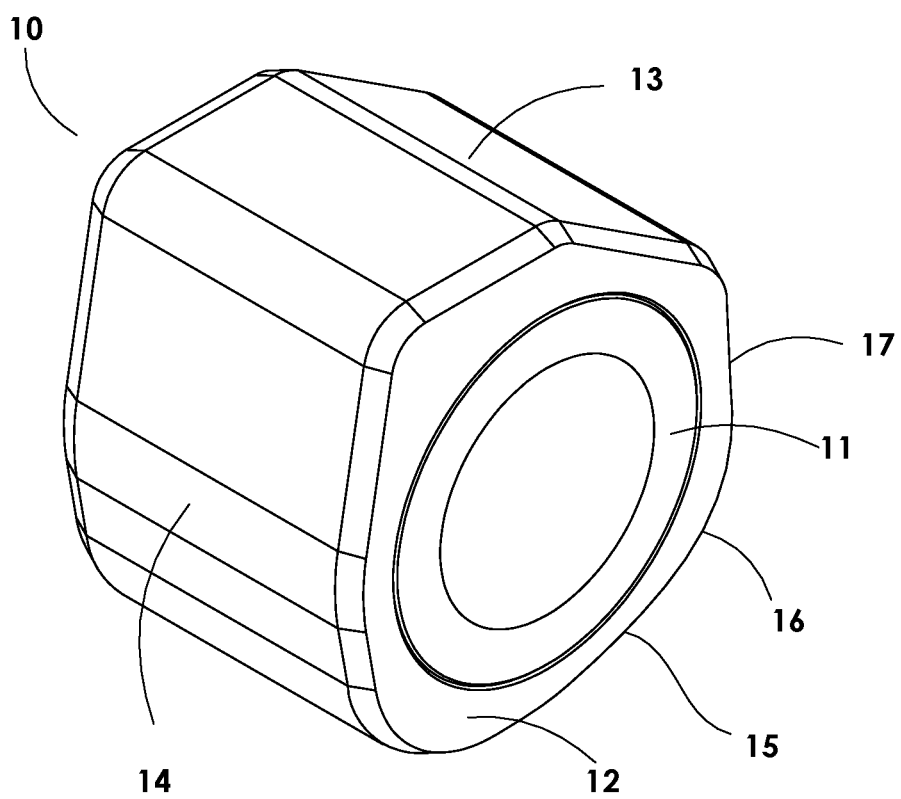
FIG. 6 is a perspective view of the roller of the present invention.
Figure 7:
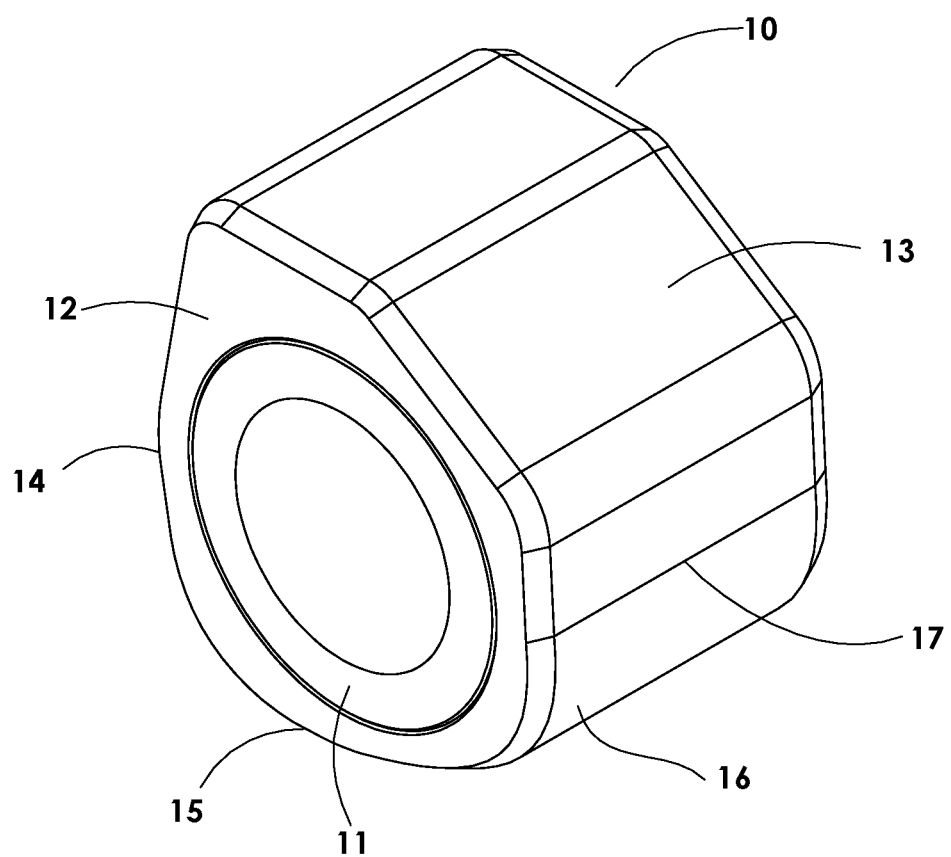
FIG. 7 is another perspective view of the roller of the present invention.
Figure 8:
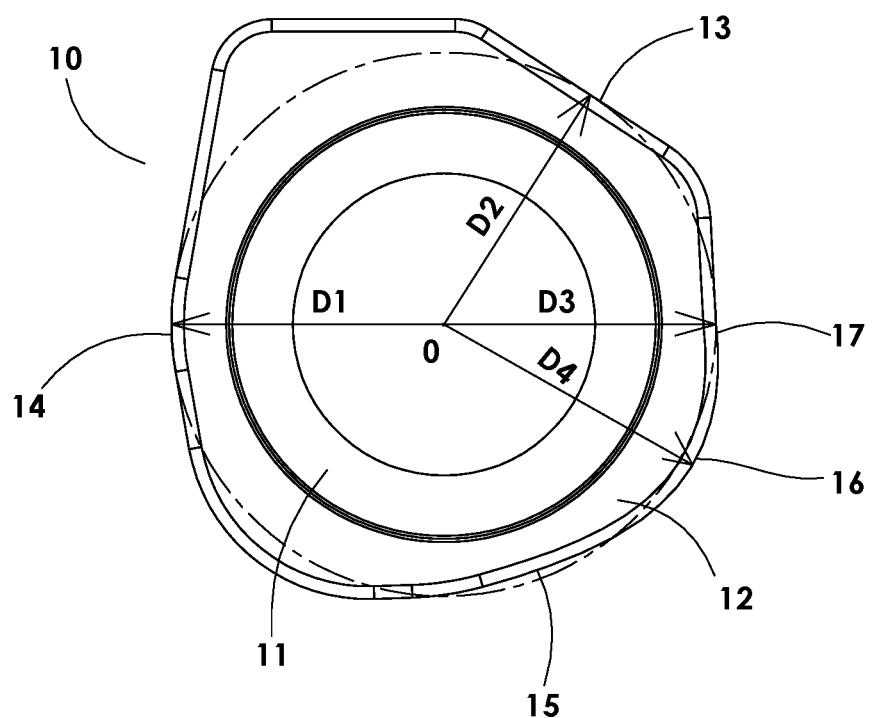
FIG. 8 is a planar view of the roller of the present invention.
Figure 11:
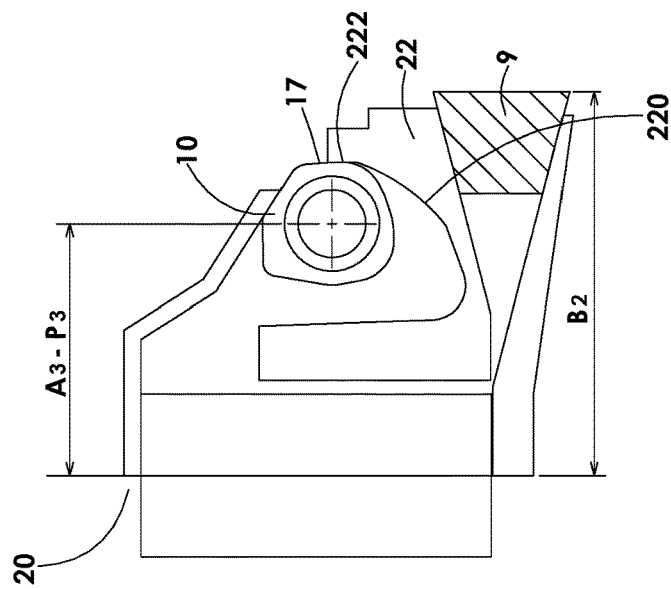
FIG. 11 is a schematic view of the roller of the present invention in the rear stage of the slide stroke.
Figure 10:
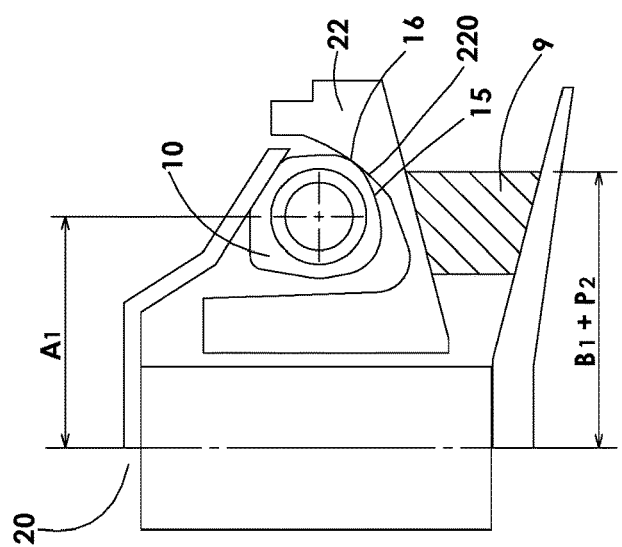
FIG. 10 is a schematic view of the roller of the present invention in the middle stage of the slide stroke.
Figure 9:
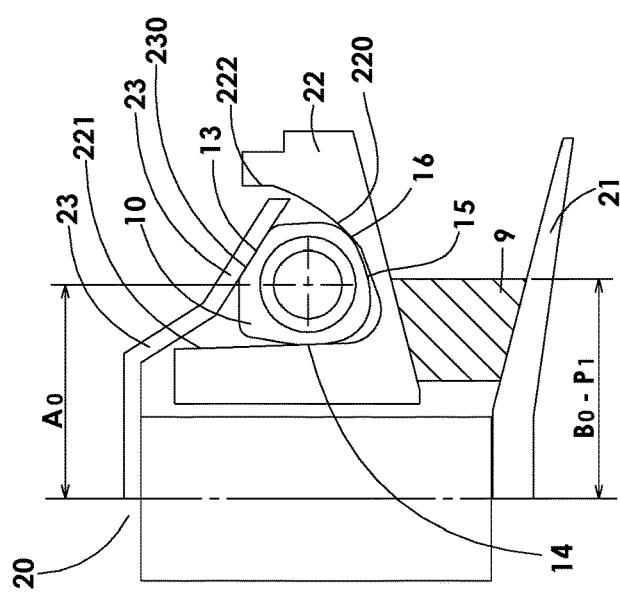
FIG. 9 is a schematic view of the roller of the present invention before sliding.

The present invention discloses a slide roller. As shown in FIG. 5 and FIG. 9, a plurality of rollers 10 is applied to a driving pulley disc assembly 20 of a stepless speed change mechanism. The driving pulley disc assembly 20 includes an immovable driving pulley disc 21, a movable driving pulley disc 22, and an immovable back plate 23. The movable driving pulley disc 22 has a plurality of roller passage surfaces 220. Each of the roller passage surfaces 220 has an inner retaining wall surface 221 at an inner end therefor and an outer retaining wall surface 222 at an outer end thereof. The immovable back plate 23 has limiting surfaces 230 opposite to the roller passage surfaces 220. The rollers 10 are located between the roller passage surfaces 220 and the limiting surfaces 230, respectively. As shown in FIG. 6, FIG. 7 and FIG. 8, the roller 10 is composed of a weight 11 and a wear-resistant layer 12 around the weight 11. A peripheral surface of the wear-resistant layer 12 has an upper sliding surface 13, an inner contact surface 14, a lower connecting surface 15, a corner sliding surface 16, and an outer contact surface 17. As shown in FIG. 8 and FIG. 9, the upper sliding surface 13 is an inclined sliding surface corresponding to the limiting surface 230 of the immovable back plate 23 and acts on the limiting surface 230. The inner contact surface 14 is a curved surface configured to abut against the inner retaining wall surface 221 when the roller 10 is located at the lowest point of the corresponding roller passage surface 220 of the movable driving pulley disc 22. The lower connecting surface 15 is disposed at the lowermost end of the roller 10 and connected with the inner contact surface 14. The corner sliding surface 16 is disposed between the lower connecting surface 15 and the outer contact surface 17 and corresponds to the roller passage surface 220 of the movable driving pulley disc 22. The corner sliding surface 16 is a curved sliding surface that can act on the roller passage surface 220. As shown in FIG. 8 and FIG. 11, the outer contact surface 17 is a surface configured to abut against the outer retaining wall surface 222 when the roller 10 is located at the highest point of the corresponding roller passage surface 220 of the movable driving pulley disc 22. As shown in FIG. 8, the center of the weight 11 is defined as a center point 0. A normal distance from the center point 0 to the inner contact surface 14 is defined as $D_1$. A vertical distance from the center point 0 to the upper sliding surface 13 is defined as $D_2$. A normal distance from the center point 0 to the outer contact surface 17 is defined as $D_3$. A normal distance from the center point 0 to the corner sliding surface 16 is defined as $D_4$. The lower connecting surface 15 of the roller 10 is never in contact with the roller passage surface 220 when the corner sliding surface 16 acts on the roller passage surface 220. The normal distance $D_1$ from the center point 0 to the inner contact surface 14 is equal to the vertical distance $D_2$ from the center point 0 to the upper sliding surface 13, and is equal to the normal distance $D_3$ from the center point 0 to the outer contact surface 17 (i.e., $D_1 = D_2 = D_3$). The normal distance $D_4$ from the center point 0 to the corner sliding surface 16 is greater than the vertical distance $D_2$ from the center point 0 to the upper sliding surface 13 (i.e., $D_2 < D_4$). As shown in FIG. 9, FIG. 10 and FIG. 11, when the driving pulley disc assembly 20 is started to rotate, the roller 10 is slid on the roller passage surface 220 of the movable driving pulley disc 22 by the centrifugal force. The size of the grooves of the driving pulley disc assembly 20 and the driven pulley disc assembly (not shown) is changed, so that the positional diameters of the belts 9 in the driving pulley disc assembly 20 and the driven pulley disc assembly (not shown) are mutually changed to achieve a speed change. During the speed change, the slide stroke of the roller 10 on the roller passage surface 220 of the movable driving pulley disc 22 is shorter, and the wear can be less. As shown in FIG. 8 and FIG. 9, the lower connecting surface 15 of the roller 10 is never in contact with the roller passage surface 220, and the corner sliding surface 16 between the lower connecting surface 15 and the outer contact support surface 17 is in contact with and acts on the roller passage surface 220. By taking advantage of the normal distance $D_4$ between the corner sliding surface 16 and the center point 0 greater than the vertical distance $D_2$ between the upper sliding surface 13 and the center point 0, namely, $D_4 > D_2$, in the initial stage of starting the driving pulley disc assembly 20, the belt 9 can be closer to the center of the rotary shaft of the driving pulley disc assembly 20, resulting in a lighter starting effect. As shown in FIG. 10, in the middle stage of the slide stroke of the corner sliding surface 16 of the roller 10 sliding on the roller passage surface 220, because the action of pushing the movable driving pulley disc 22 outwardly is large, better acceleration can be obtained. As shown in FIG. 11, the better acceleration of the earlier speed change in the middle stage of the slide stroke enables the driving pulley disc assembly 20 to drive the driven pulley disc assembly (not shown in the figures) at a lower rotational speed to produce a higher speed transmission effect in the rear stage of the slide stroke of the roller 10.

Figure 2:
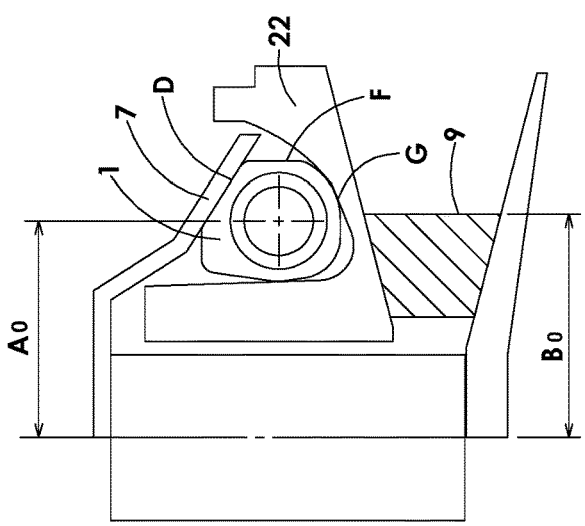
FIG. 2 is a schematic view of the conventional slide roller before sliding.

According to the above embodiment, as shown in FIG. 2 and FIG. 9, the roller 10 of the present invention is compared with the conventional slide roller 1 under the same condition of the movable driving pulley disc.

1. As shown in FIG. 2 and FIG. 9, the distance between the center point 0 and the center of the rotary shaft in the beginning of the slide is $A_0$, the distance from the belt 9 to the center of the rotary shaft caused by the roller 10 of the present invention is decreased by $P_1$ when compared with the distance $B_0$ from the belt 9 to the center of the rotary shaft caused by the conventional slide roller 1 (i.e., $B_0-P_1<B_0$). Therefore, the roller 10 of the present invention has a lighter starting effect than that of the conventional slide roller 1.

Figure 3:
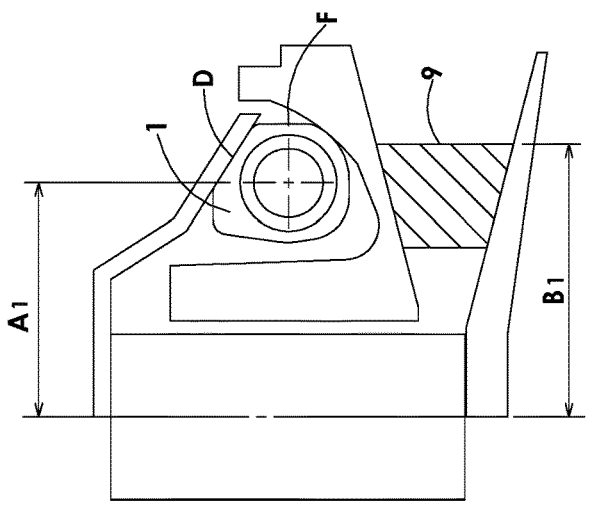
FIG. 3 is a schematic view of the conventional slide roller in the middle stage of the slide stroke.

2. In the middle stage of the slide stroke, as shown in FIG. 3 and FIG. 10, the distance from the center point 0 of the roller 10 of the present invention to the center of the rotary shaft is $A_1$, which is equal to the distance $A_1$ from the center point 0 of the conventional slide roller 1 to the center of the rotary shaft. However, the distance between the belt 9 and the center of the rotary shaft caused by the roller 10 of the present invention is increased by the distance $P_2$ when compared with the distance $B_1$ of the conventional slide roller 1 (namely, $B_1+P_2>B_1$). Therefore, the roller 10 of the present invention has better acceleration performance in the middle stage of the slide stroke than the conventional slide roller 1.

Figure 1:
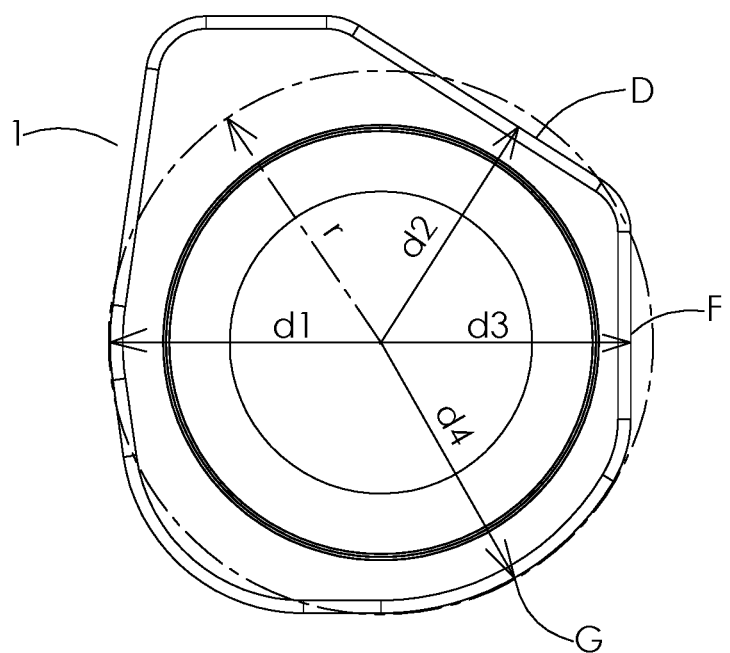
FIG. 1 is a planar view of a conventional slide roller for a continuously variable transmission.
Figure 4:
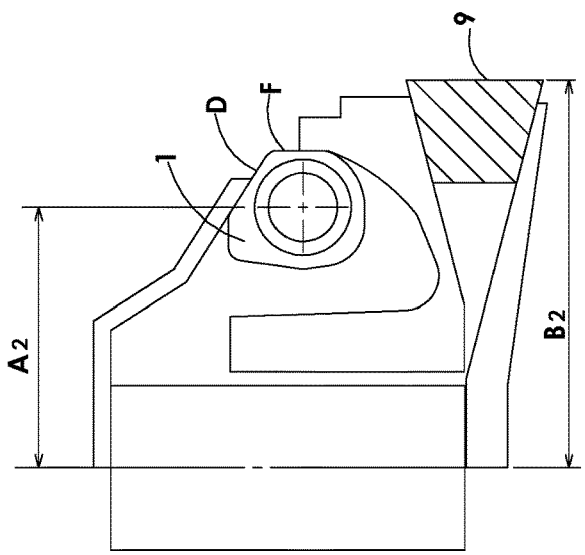
FIG. 4 is a schematic view of the conventional slide roller in the rear stage of the slide stroke.

3. As shown in FIG. 4 and FIG. 11, in the rear stage of the slide stroke, when the distance between the belt 9 and the center of the rotary shaft is the maximum distance $B_2$, the distance between the center point 0 of the roller 10 of the present invention and the center of the rotary shaft is decreased by the distance $P_3$ when compared with the distance $A_3$ between the center point 0 of the conventional slide roller 1 and the center of the rotary shaft (i.e., $A_3-P_3<A_3$). Therefore, the roller 10 of the present invention enables the driving pulley disc assembly 20 to drive the driven pulley disc assembly with a lower rotational speed to generate a high speed running (speed per hour) effect.

Compared with the conventional slide roller 1, the roller 10 of the present invention can enhance the efficiency or effect, which can be confirmed and verified by the test report of Annex I.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A slide roller, a plurality of rollers being applied to a driving pulley disc assembly of a stepless speed change mechanism; the driving pulley disc assembly including an immovable driving pulley disc, a movable driving pulley disc, and an immovable back plate; the movable driving pulley disc having a plurality of roller passage surfaces, the roller passage surfaces each having an inner retaining wall surface at an inner end therefor and an outer retaining wall surface at an outer end thereof; the immovable back plate having limiting surfaces opposite to the roller passage surfaces respectively, the rollers being located between the roller passage surfaces and the limiting surfaces respectively; the roller being composed of a weight and a wear-resistant layer around the weight, a peripheral surface of the wear-resistant layer having an upper sliding surface, an inner contact surface, a lower connecting surface, a corner sliding surface, and an outer contact surface; the upper sliding surface being an inclined sliding surface corresponding to a corresponding one of the limiting surfaces of the immovable back plate and acting on the corresponding limiting surface; the inner contact surface being a curved surface configured to abut against the inner retaining wall surface when the roller is located at a lowest point of a corresponding one of the roller passage surfaces of the movable driving pulley disc; the lower connecting surface being disposed at a lowermost end of the roller and connected with the inner contact surface; the corner sliding surface being disposed between the lower connecting surface and the outer contact surface and corresponding to the corresponding roller passage surface of the movable driving pulley disc, the corner sliding surface being a curved sliding surface that can act on the corresponding roller passage surface; the outer contact surface being configured to abut against the outer retaining wall surface when the roller is located at a highest point of the corresponding roller passage surface of the movable driving pulley disc; a center of the weight being defined as a center point (0), a normal distance from the center point (0) to the inner contact surface being defined as ($D_1$) a vertical distance from the center point (0) to the upper sliding surface being defined as ($D_2$), a normal distance from the center point (0) to the outer contact surface being defined as ($D_3$) a normal distance from the center point (0) to the corner sliding surface being defined as ($D_4$) characterized in that: the lower connecting surface of the roller is never in contact with the roller passage surface when the corner sliding surface acts on the roller passage surface, the normal distance ($D_1$) from the center point (0) to the inner contact surface is equal to the vertical distance ($D_2$) from the center point (0) to the upper sliding surface and is equal to the normal distance ($D_3$) from the center point (0) to the outer contact surface, the normal distance ($D_4$) from the center point (0) to the corner sliding surface is greater than the vertical distance ($D_2$) from the center point (0) to the upper sliding surface.

* * * * *